United States Patent
Hou

(10) Patent No.: US 10,294,031 B2
(45) Date of Patent: May 21, 2019

(54) CONVEYOR BELT

(71) Applicant: The Yokohama Rubber Co., LTD., Minato-ku, Tokyo (JP)

(72) Inventor: Gang Hou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 24 days.

(21) Appl. No.: 15/527,694

(22) PCT Filed: Aug. 26, 2015

(86) PCT No.: PCT/JP2015/074067
§ 371 (c)(1),
(2) Date: May 17, 2017

(87) PCT Pub. No.: WO2016/080041
PCT Pub. Date: May 26, 2016

(65) Prior Publication Data
US 2018/0305128 A1  Oct. 25, 2018

(30) Foreign Application Priority Data

Nov. 17, 2014 (JP) .................. 2014-232844

(51) Int. Cl.
| | | |
|---|---|---|
| *B65G 15/32* | (2006.01) | |
| *B65G 15/34* | (2006.01) | |
| *B65G 15/40* | (2006.01) | |
| *B29D 29/06* | (2006.01) | |

(52) U.S. Cl.
CPC ............. *B65G 15/34* (2013.01); *B65G 15/40* (2013.01); *B29D 29/06* (2013.01); *B65G 2207/28* (2013.01); *B65G 2207/48* (2013.01); *B65G 2812/02178* (2013.01)

(58) Field of Classification Search
None
See application file for complete search history.

(56) References Cited

U.S. PATENT DOCUMENTS

| | | | |
|---|---|---|---|
| 2,237,173 | A | 4/1941 | Brill |
| 2,252,836 | A | 8/1941 | Curry et al. |
| 3,221,869 | A | 12/1965 | Paasche |

(Continued)

FOREIGN PATENT DOCUMENTS

| | | |
|---|---|---|
| CN | 202193398 | 4/2012 |
| DE | 1 055 898 | 4/1959 |

(Continued)

OTHER PUBLICATIONS

International Search Report for International Application No. PCT/JP2015/074067 dated Nov. 24, 2015, 4 pages, Japan.

*Primary Examiner* — Kavel Singh
(74) *Attorney, Agent, or Firm* — Thorpe North & Western

(57) ABSTRACT

Provided is a conveyor belt. The upper cover rubber has a configuration in which a wear resistance layer and an impact resistance layer are layered in this order from an outer peripheral side of the conveyor belt. The wear resistance layer has a loss coefficient of from 0.03 to 0.25 and a loss elastic coefficient of from 0.20 MPa to 6.50 MPa at 20° C. The impact resistance layer has a loss coefficient of from 0.15 to 0.70 and a loss elastic coefficient of from 1.5 MPa to 30.0 MPa at 20° C.

3 Claims, 2 Drawing Sheets

(56) References Cited

U.S. PATENT DOCUMENTS

| | | | |
|---|---|---|---|
| 5,958,570 A | * | 9/1999 | Schwambach ........ B29C 70/086 428/217 |
| 2009/0176628 A1 | | 7/2009 | Radding et al. |
| 2010/0279809 A1 | | 11/2010 | Radding et al. |
| 2012/0067706 A1 | | 3/2012 | Terada et al. |

FOREIGN PATENT DOCUMENTS

| | | |
|---|---|---|
| DE | 1 127 279 | 4/1962 |
| JP | S62-079710 | 5/1987 |
| JP | 2008-285326 | 11/2008 |
| JP | 2012-012207 | 1/2012 |
| JP | 2013-107729 | 6/2013 |
| WO | WO 2012/026534 | 3/2012 |

* cited by examiner

CONVEYOR BELT

TECHNICAL FIELD

The present technology relates to a conveyor belt, and more particularly relates to a conveyor belt capable of improving both wear resistance and impact resistance of an upper cover rubber in a compatible manner.

BACKGROUND ART

A conveyor belt generally has a configuration in which an upper cover rubber is layered on an outer peripheral side of a core formed from a canvas layer or a steel cord layer, and a lower cover rubber is layered on an inner peripheral side of the core. An object to be conveyed is fed and placed onto the upper cover rubber and conveyed. The upper cover rubber is subject to great impact depending on the fed object to be conveyed. The impact causes damage to the upper cover rubber to progress over time. The damage to the upper cover rubber is significant in the case where the object to be conveyed has a sharp projection on a surface of the object to be conveyed.

The conveying speed of the conveyor belt is different from the speed of the fed object to be conveyed in a belt conveying direction. As a result, friction generates between the upper cover rubber and the object to be conveyed. Friction also generates between the upper cover rubber and the object to be conveyed while the object to be conveyed is conveyed. The friction causes wear on the upper cover rubber to progress over time.

When the damage and wear caused by the impact reach the core, the conveyor belt cannot be used. Accordingly, the upper cover rubber having improved impact resistance and wear resistance can extend the service life of the conveyor belt.

Conventionally, various conveyor belts have been proposed. Such conveyor belts achieve good wear resistance and impact resistance in a compatible manner (For example, Japanese Unexamined Patent Application Publication No. 2013-107729A). Including the conveyor belt proposed in Japanese Unexamined Patent Application Publication No. 2013-107729A, conveyor belts are known that have a configuration in which special rubber composition having good wear resistance and impact resistance is used as the upper cover rubber (paragraph [0145] of Japanese Unexamined Patent Application Publication No. 2013-107729A). However, achieving good wear resistance and impact resistance in a compatible manner with single rubber composition is difficult. Conventional conveyor belts have a tendency in that one or both characteristics are improved insufficiently.

SUMMARY

The present technology provides a conveyor belt capable of improving both wear resistance and impact resistance of an upper cover rubber in a compatible manner.

A conveyor belt of the present technology includes an upper cover rubber, a lower cover rubber, and a core. The core is embedded between the upper cover rubber and the lower cover rubber. The upper cover rubber includes a wear resistance layer and an impact resistance layer. The wear resistance layer and the impact resistance layer are layered in this order from an outer peripheral side of the conveyor belt. The wear resistance layer has a loss coefficient of from 0.03 to 0.25 and a loss elastic coefficient of from 0.20 MPa to 6.50 MPa at 20° C. The impact resistance layer has a loss coefficient of from 0.15 to 0.70 and a loss elastic coefficient of from 1.5 MPa to 30.0 MPa at 20° C.

According to the present technology, the wear resistance layer for which each of a loss coefficient and a loss elastic coefficient is set to a specific range is provided as the upper cover rubber. As a result, the wear resistance layer can reduce wear caused by friction generated between the object to be conveyed and the upper cover rubber. The impact resistance layer for which each of a loss coefficient and a loss elastic coefficient is set to a specific range is provided as the upper cover rubber. As a result, the impact resistance layer can reduce damage caused by impact received from the object to be conveyed.

The wear resistance layer disposed on an outer peripheral side of the impact resistance layer protects the impact resistance layer from wear caused by the object to be conveyed. This is advantageous in exhibiting good impact resistance over an extended period of time. Meanwhile, the impact resistance layer disposed on an inner peripheral side of the wear resistance layer exhibits good impact resistance and absorbs impact caused by the fed object to be conveyed over an extended period of time, which reduces damage caused by the impact on the wear resistance layer. In this way, due to synergistic effects of the separately provided wear resistance layer having good wear resistance and impact resistance layer having good impact resistance, both the wear resistance and impact resistance of the upper cover rubber are sufficiently improved, which is advantageous in extending the service life of the conveyor belt.

A configuration is possible in which the wear resistance layer is disposed furthest out on a periphery of the upper cover rubber. In such a configuration, the wear resistance layer is disposed at a position making it come into direct contact with the object to be conveyed, which is the most advantageous in suppressing wear on the upper cover rubber.

The wear resistance layer has a configuration in which a layer thickness of the wear resistance layer is, for example, from 2 mm to 30 mm. In such a configuration, the layer thickness of the wear resistance layer is not excessive, which allows deterioration in bending resistance of the conveyor belt to be avoided and sufficient wear resistance to be obtained.

The impact resistance layer has a configuration in which a layer thickness of the impact resistance layer is from 2 mm to 30 mm. In such a configuration, the layer thickness of the impact resistance layer is not excessive, which allows deterioration in bending resistance of the conveyor belt to be avoided and sufficient impact resistance to be obtained.

A configuration is also possible in which the layer thickness of the impact resistance layer is greater at a central portion in a belt width direction than at both end portions in the belt width direction. A carrying side of the conveyor belt where the object to be conveyed is fed onto the upper cover rubber is trough-like. Accordingly, the upper cover rubber receives smaller impact from the fed object to be conveyed at the both end portions in the belt width direction than at the central portion in the belt width direction. In such a configuration, the impact resistance layer has a non-excessive layer thickness at both end portions in the belt width direction, which improves bending resistance of the conveyor belt and is advantageous in reducing weight. This can reduce the energy required for running of the conveyor belt.

DETAILED DESCRIPTION

Figure 1:
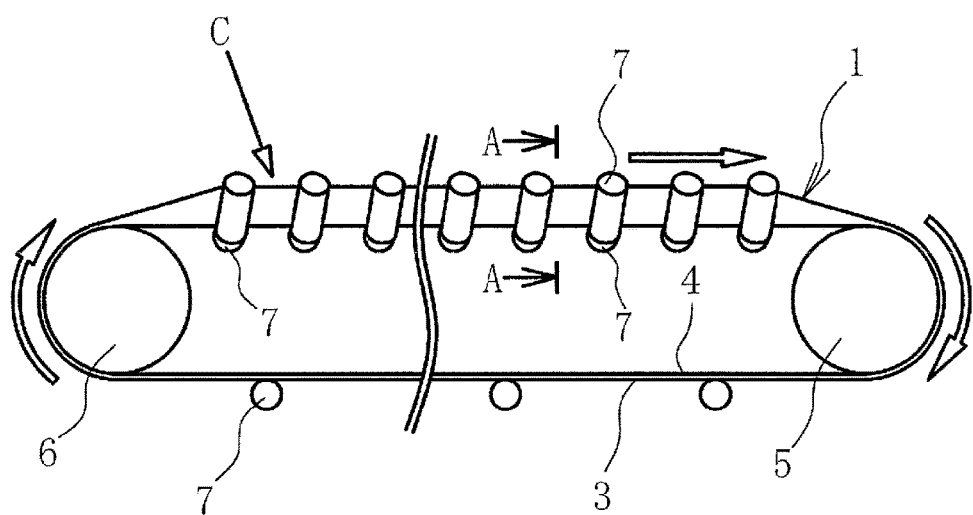
FIG. 1 is an explanatory view illustrating a state where a conveyor belt of an embodiment of the present technology is stretched between pulleys.

Below, description will be given of the conveyor belt of the present technology on the basis of embodiments illustrated in the drawings. A dot-dash line CL in FIGS. 3 and 4 indicates a center in the belt width direction.

Figure 2:
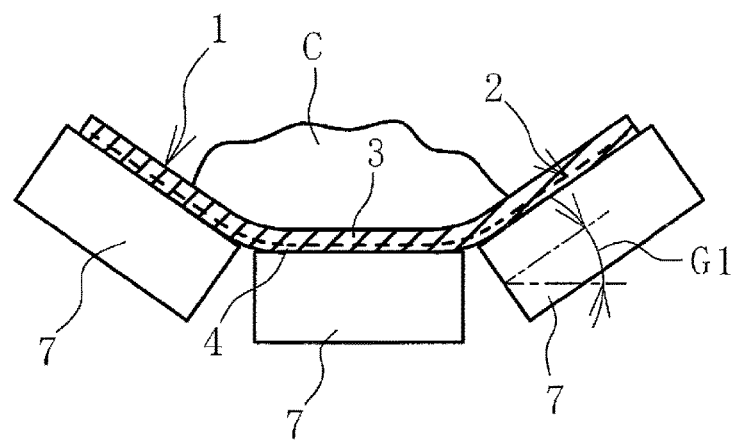
FIG. 2 is a cross-sectional view taken along A-A in FIG. 1.

A conveyor belt 1 according to an embodiment of the present technology illustrated in FIGS. 1 and 2 includes a core 2, an upper cover rubber 3, and a lower cover rubber 4. The upper cover rubber 3 is layered on an outer peripheral side of the core 2. The lower cover rubber 4 is layered on an inner peripheral side of the core 2. The core 2 is embedded between the upper cover rubber 3 and the lower cover rubber 4. These are integrated by vulcanization bonding. As described below, both end portions in the belt width direction of the core 2 may be an edge rubber made from a rubber material different from that of the upper cover rubber 3 and the lower cover rubber 4.

The conveyor belt 1 is stretched between a driving pulley 5 and a driven pulley 6 of a belt conveyor device. The core 2 is a member which bears the tension when the conveyor belt 1 is stretched. The core 2 is constituted by a fiber layer such as a canvas. Alternatively, the core 2 is constituted by a plurality of steel cords (steel cord layer) extending in a longitudinal direction parallel to the belt width direction. The material and the number of layers of the core 2 are determined according to the properties (rigidity, elongation, and the like) demanded with respect to the conveyor belt 1. A single layer, plural layer, or multilayer structure is employed for the fiber layer. A single layer structure is employed for the steel cord layer. A reinforcing layer is also embedded in the conveyor belt 1 as necessary.

The carrying side of the conveyor belt 1 is supported by support rollers 7 in manner in which both end portions in the belt width direction of the conveyor belt 1 are inclined at a predetermined trough angle G1 with respect to a horizontal direction, giving the conveyor belt 1 a trough-like shape. The support rollers 7 are in contact with the lower cover rubber 4 and roll. Meanwhile, on a return side of the conveyor belt 1, the upper cover rubber 3 is supported by the support rollers 7 in a state in which the conveyor belt 1 is substantially flat in the belt width direction. An object to be conveyed C is fed onto the upper cover rubber 3 of the conveyor belt 1 on the carrying side.

Figure 3:
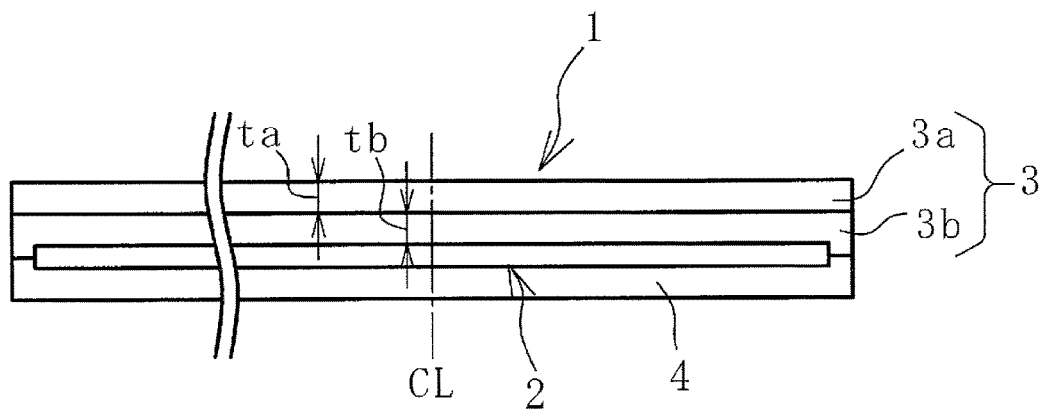
FIG. 3 is a cross-sectional view in a belt width direction illustrating a state where the conveyor belt in FIG. 1 is flat.

As illustrated in FIG. 3, the upper cover rubber 3 is constituted by a wear resistance layer 3a and an impact resistance layer 3b. The wear resistance layer 3a and the impact resistance layer 3b are layered in this order from an outer peripheral side of the conveyor belt. In this embodiment, the wear resistance layer 3a is disposed furthest out on the periphery of the upper cover rubber 3. An inner peripheral surface of the wear resistance layer 3a and an outer peripheral surface of the impact resistance layer 3b are vulcanization bonded. An inner peripheral surface of the impact resistance layer 3b and an outer peripheral surface of a core 2 are vulcanization bonded with an adhesive rubber interposed therebetween. Each of a layer thickness to of the wear resistance layer 3a and a layer thickness tb of the impact resistance layer 3b is constant in the belt width direction.

An inner peripheral surface of the lower cover rubber 4 and an outer peripheral surface of the core 2 are vulcanization bonded with an adhesive rubber interposed therebetween. A known configuration is employed for the lower cover rubber 4.

The wear resistance layer 3a exhibits good wear resistance as compared with the other portions. A loss coefficient Tan δ at 20° C. of the wear resistance layer 3a is set to be from 0.03 to 0.25. A loss elastic coefficient of the wear resistance layer 3a is set to be from 0.2 MPa to 6.5 MPa. Preferably, a wear volume loss of the wear resistance layer 3a is preferably not greater than 50 mm$^3$.

The wear resistance layer 3a having a loss coefficient Tan δ of less than 0.03 cannot ensure sufficient wear resistance performance and physical properties in normal state. The wear resistance layer 3a having a loss coefficient Tan δ of greater than 0.25 cannot ensure optimum wear resistance performance. The wear resistance layer 3a having a loss elastic coefficient of less than 0.2 MPa cannot ensure sufficient wear resistance performance and physical properties in normal state. The wear resistance layer 3a having a loss elastic coefficient of greater than 6.5 MPa cannot ensure optimum wear resistance performance.

The impact resistance layer 3b exhibits good impact resistance as compared with the other portions. A loss coefficient Tan δ at 20° C. of the impact resistance layer 3b is set to be from 0.15 to 0.70. A loss elastic coefficient of the impact resistance layer 3b is set to be from 1.5 MPa to 30.0 MPa.

The impact resistance layer 3b having a loss coefficient Tan δ of less than 0.15 cannot ensure sufficient impact resistance. The impact resistance layer 3b having a loss coefficient Tan δ of greater than 0.70 may be easily scratched on the rubber surface, which results in shorter service life (service lifetime). The impact resistance layer 3b having a loss elastic coefficient of less than 1.5 MPa cannot ensure sufficient impact resistance. The impact resistance layer 3b having a loss elastic coefficient of greater than 30.0 MPa may be easily scratched on the rubber surface, which results in shorter service life (service lifetime).

A loss coefficient Tan δ and a loss elastic coefficient prescribed by the present technology are values obtained by measuring strip-shaped test pieces (20 mm in length×5 mm in width×2 mm in thickness) cut out from vulcanized rubber sheets of which the wear resistance layer 3a and the impact resistance layer 3b are formed using a viscoelastic spectrometer specified by JIS (Japanese Industrial Standard) K 6394 (for example, a spectrometer manufactured by Toyo Seiki Seisaku-Sho, Ltd.). The measurement is performed under conditions of the test pieces being at 10% strain (initial strain) and subjected to a vibration at ±2% amplitude and a frequency of 10 Hz at a measurement temperature of 20° C.

A wear volume loss prescribed by the present technology is a value obtained by measuring a test piece (16 mm in diameter, 6 mm in thickness) cut out from a vulcanized rubber sheet of which the wear resistance layer 3a is formed in accordance with a DIN (Deutsches Institut für Normung (German Institute for Standardization)) wear test method (A method) specified by JIS K 6264-2:2005 (ISO4649). In this measurement, the wear volume of the test piece is measured at a temperature of 23° C.

In the present technology, the wear resistance layer 3a for which the loss coefficient Tan δ and the loss elastic coefficient are set to a specific range is provided as the upper cover rubber 3. As a result, the wear resistance layer 3a reduces wear caused by friction with the fed object to be conveyed C. The impact resistance layer 3b for which the loss coefficient Tan δ and the loss elastic coefficient are set to a specific range is provided as the upper cover rubber 3. As a result, the impact resistance layer 3b reduces wear caused by friction with the fed object to be conveyed C.

The wear resistance layer 3a disposed on an outer peripheral side of the impact resistance layer 3b protects the impact resistance layer 3b from wear caused by the object to be conveyed C, which is advantageous in exhibiting good impact resistance over an extended period of time. Meanwhile, the impact resistance layer 3b disposed on an inner peripheral side of the wear resistance layer 3a exhibits good impact resistance and absorbs impact caused by the fed object to be conveyed C over an extended period of time, which reduces damage caused by impact on the wear resistance layer 3a. Therefore, the wear resistance layer 3a can exhibit good wear resistance over an extended period of time.

In this way, due to synergistic effects of the separately provided the wear resistance layer 3a having good wear resistance and the impact resistance layer 3b having good impact resistance, both characteristics are sufficiently improved. This is advantageous in extending the service life of the conveyor belt 1.

In a configuration such as one similar to this embodiment in which the wear resistance layer 3a is disposed furthest out on the periphery of the upper cover rubber 3, the wear resistance layer 3a is disposed at a position making it come into direct contact with the object to be conveyed C. This is the most advantageous in suppressing wear on the upper cover rubber 3.

Another layer may be disposed on the outer peripheral side of the wear resistance layer 3a. Another layer may also be disposed between the wear resistance layer 3a and the impact resistance layer 3b. Such a configuration in which the impact resistance layer 3b is disposed on the inner peripheral side of the wear resistance layer 3a is preferably so that the wear resistance layer 3a and the impact resistance layer 3b and their good characteristics influence each other, and synergistic effects can be exhibited.

The wear resistance layer 3a has a configuration in which the layer thickness ta of the wear resistance layer 3a is, for example, from 2 mm to 30 mm. In such a configuration, the layer thickness ta of the wear resistance layer 3a is not excessive, allowing deterioration in bending resistance of the conveyor belt 1 to be avoided. This is advantageous in reducing energy required for running of the conveyor belt 1. The wear resistance layer having a layer thickness ta of 2 mm or greater can have sufficient wear resistance.

The impact resistance layer 3b has a configuration in which the layer thickness tb of the impact resistance layer 3b is, for example, from 2 mm to 30 mm. In such a configuration, the layer thickness tb of the impact resistance layer 3b is not excessive, allowing deterioration in bending resistance of the conveyor belt 1 to be avoided. This is advantageous in reducing energy required for running of the conveyor belt 1. The impact resistance layer 3b having a layer thickness tb of 2 mm or greater can have sufficient impact resistance.

Figure 4:
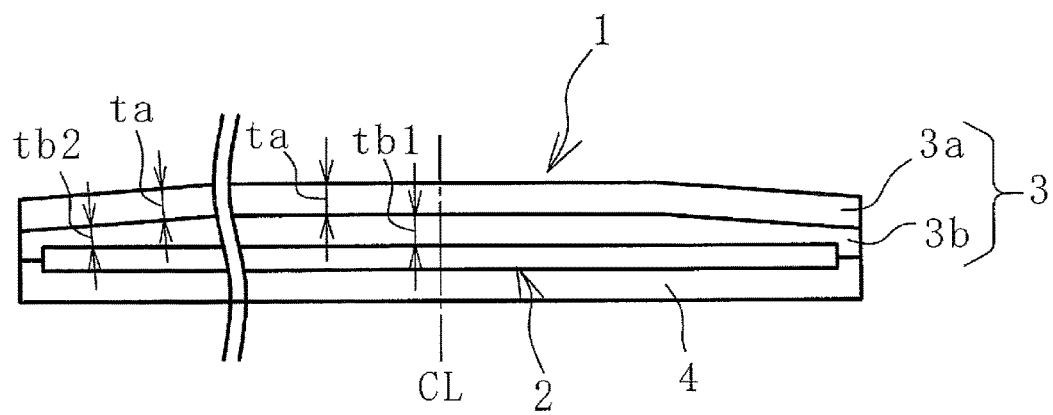
FIG. 4 is a cross-sectional view in a belt width direction illustrating a state where a conveyor belt according to another embodiment is flat.

As illustrated in FIG. 4, a configuration is also possible in which a layer thickness tb1 of the impact resistance layer 3b at the central portion in the belt width direction is greater than a layer thickness tb2 at both end portions in the belt width direction. The carrying side of the conveyor belt 1 where the object to be conveyed C is fed onto the upper cover rubber 3 is trough-like. Accordingly, the upper cover rubber 3 receives smaller impact from the fed object to be conveyed C at the both end portions in the belt width direction than at the central portion in the belt width direction. Each of the end portions in the belt width direction is a portion ranging from a start point, which is located at the corresponding end portion in the belt width direction, to an end point, which is located at a position about from 10% to 20% of the belt width toward the central portion in the belt width direction from the start point.

Accordingly, the impact resistance layer 3b may have a thinner layer thickness at the both end portions in the belt width direction than at the central portion in the belt width direction. According to this embodiment, the impact resistance layer 3b has a non-excessive layer thickness tb at both end portions in the belt width direction, which improves bending resistance of the conveyor belt 1 and is advantageous in reducing weight. This can reduce the energy required for running of the conveyor belt 1.

In this embodiment, the layer thickness ta of the wear resistance layer 3a is constant in the belt width direction. The friction with the object to be conveyed C is smaller at the both end portions in the belt width direction than at the central part in the belt width direction similar to that of the impact resistance layer 3b. Therefore, the wear resistance layer 3a can have a greater layer thickness ta at the central part in the belt width direction than at the both end portions in the belt width direction.

The invention claimed is:

1. A conveyor belt comprising:
an upper cover rubber comprising:
a wear resistance layer; and
an impact resistance layer;
the wear resistance layer and the impact resistance layer being layered in this order from an outer peripheral side of the conveyor belt;
a lower cover rubber; and
a core embedded between the upper cover rubber and the lower cover rubber; wherein
the wear resistance layer is rubber which has a loss coefficient of from 0.03 to 0.25 and a loss elastic coefficient of from 0.20 MPa to 6.50 MPa at 20° C.,
the impact resistance layer is rubber which has a loss coefficient of from 0.15 to 0.70 and a loss elastic coefficient of from 1.5 MPa to 30.0 MPa at 20° C.,
the wear resistance layer exhibits increased wear resistance as compared with the impact resistance layer,
the impact resistance layer exhibits increased impact resistance as compared with the wear resistance layer, and
a layer thickness of each of the wear resistance layer and the impact resistance layer is from 2.0 mm to 30.0 mm.

2. The conveyor belt according to claim 1, wherein the wear resistance layer is disposed furthest out on a periphery of the upper cover rubber.

3. The conveyor belt according to claim 1, wherein the layer thickness of the wear resistance layer is constant in the belt width direction and the layer thickness of the impact resistance layer is greater at a central part in a belt width direction than at both end portions in the belt width direction.

* * * * *